US010687576B2

(12) United States Patent
Day

(10) Patent No.: US 10,687,576 B2
(45) Date of Patent: Jun. 23, 2020

(54) SPRING ABSORPTION TECHNOLOGY (S.A.T.) HELMET

(71) Applicant: Sedrick Dewayne Day, Willacoochee, GA (US)

(72) Inventor: Sedrick Dewayne Day, Willacoochee, GA (US)

(73) Assignee: Sedrick Day, Willacoochee, GA (US)

( * ) Notice: Subject to any disclaimer, the term of this patent is extended or adjusted under 35 U.S.C. 154(b) by 278 days.

(21) Appl. No.: 15/885,909

(22) Filed: Feb. 1, 2018

(65) Prior Publication Data
US 2018/0228239 A1 Aug. 16, 2018

Related U.S. Application Data

(63) Continuation-in-part of application No. 14/833,027, filed on Aug. 21, 2015, now abandoned.

(51) Int. Cl.
| | |
|---|---|
| *A42B 3/06* | (2006.01) |
| *F16F 1/12* | (2006.01) |
| *A42B 3/12* | (2006.01) |
| *A42B 3/20* | (2006.01) |
| *F16F 1/04* | (2006.01) |

(52) U.S. Cl.
CPC .............. *A42B 3/064* (2013.01); *A42B 3/125* (2013.01); *A42B 3/205* (2013.01); *F16F 1/122* (2013.01); *F16F 1/126* (2013.01); *F16F 1/04* (2013.01)

(58) Field of Classification Search
CPC ........... F16F 3/0873; F16F 3/04; A42B 3/064; A42B 3/12; A42B 3/128; A42B 3/063; A42B 3/125; A42B 3/06; A42B 3/14; B65D 41/0471

USPC ..................................................... 2/411, 412
See application file for complete search history.

(56) References Cited

U.S. PATENT DOCUMENTS

| | | | | |
|---|---|---|---|---|
| 1,104,808 | A * | 7/1914 | Kockrow ................. | A42B 3/06 2/6.1 |
| 2,360,101 | A * | 10/1944 | Bowers ..................... | A61F 9/06 2/8.1 |
| 3,991,423 | A * | 11/1976 | Jones .................... | A42B 3/0473 2/415 |
| 5,101,517 | A * | 4/1992 | Douglas ................... | A42B 3/20 2/424 |
| 5,204,998 | A * | 4/1993 | Liu ....................... | F16F 1/3732 2/411 |
| 5,263,203 | A * | 11/1993 | Kraemer ................ | A42B 3/122 2/413 |

(Continued)

FOREIGN PATENT DOCUMENTS

CN 206880169 U * 1/2018

*Primary Examiner* — Nathan E Durham
*Assistant Examiner* — Abby M Spatz

(57) ABSTRACT

A protective helmet comprising at least one compression spring that connects one or more inner shells to an outer shell. Once the multiple shells are connected, they provide a multiple layer protection system that absorbs and reflects energy by compressing. The compression springs also comprise a threaded spring cap that allows for easy connecting and disconnecting between the compression springs and the shells. The threaded spring cap allows the springs to be exchange within the multilayered shell, for springs of a different compression rate, size, or material if desired; which would allow customization of the protection level provided by the protective helmet.

3 Claims, 11 Drawing Sheets

(56) References Cited

U.S. PATENT DOCUMENTS

| | | | | |
|---|---|---|---|---|
| 5,950,244 A * | 9/1999 | Fournier | A42B 3/128 | 2/411 |
| 6,314,586 B1 * | 11/2001 | Duguid | A42B 3/069 | 2/411 |
| 6,378,140 B1 * | 4/2002 | Abraham | A42B 3/064 | 2/411 |
| 8,566,968 B2 * | 10/2013 | Marzec | A42B 3/12 | 2/411 |
| 8,640,267 B1 * | 2/2014 | Cohen | A42B 3/063 | 2/411 |
| 8,756,719 B2 * | 6/2014 | Veazie | A42B 3/121 | 2/411 |
| 2006/0059606 A1 * | 3/2006 | Ferrara | A01N 25/18 | 2/412 |
| 2010/0258988 A1 * | 10/2010 | Darnell | A42B 3/064 | 267/141 |
| 2012/0180200 A1 * | 7/2012 | Gaudet | A42B 3/121 | 2/411 |
| 2012/0198604 A1 * | 8/2012 | Weber | A42B 3/125 | 2/414 |
| 2013/0061371 A1 * | 3/2013 | Phipps | A42B 3/064 | 2/411 |
| 2013/0185837 A1 * | 7/2013 | Phipps | A42B 3/12 | 2/2.5 |
| 2014/0068841 A1 * | 3/2014 | Brown | A42B 3/122 | 2/413 |
| 2014/0090155 A1 * | 4/2014 | Johnston | A42B 3/064 | 2/414 |
| 2014/0215694 A1 * | 8/2014 | Grice | A42B 3/064 | 2/411 |
| 2014/0283286 A1 * | 9/2014 | Yoon | A42B 3/069 | 2/411 |
| 2015/0047109 A1 * | 2/2015 | Grant | A42B 3/125 | 2/414 |
| 2015/0359285 A1 * | 12/2015 | Rennaker, II | A42B 3/064 | 2/414 |
| 2016/0161222 A1 * | 6/2016 | Lee | A42B 3/065 | |
| 2016/0369861 A1 * | 12/2016 | Phipps | B60R 19/28 | |

* cited by examiner

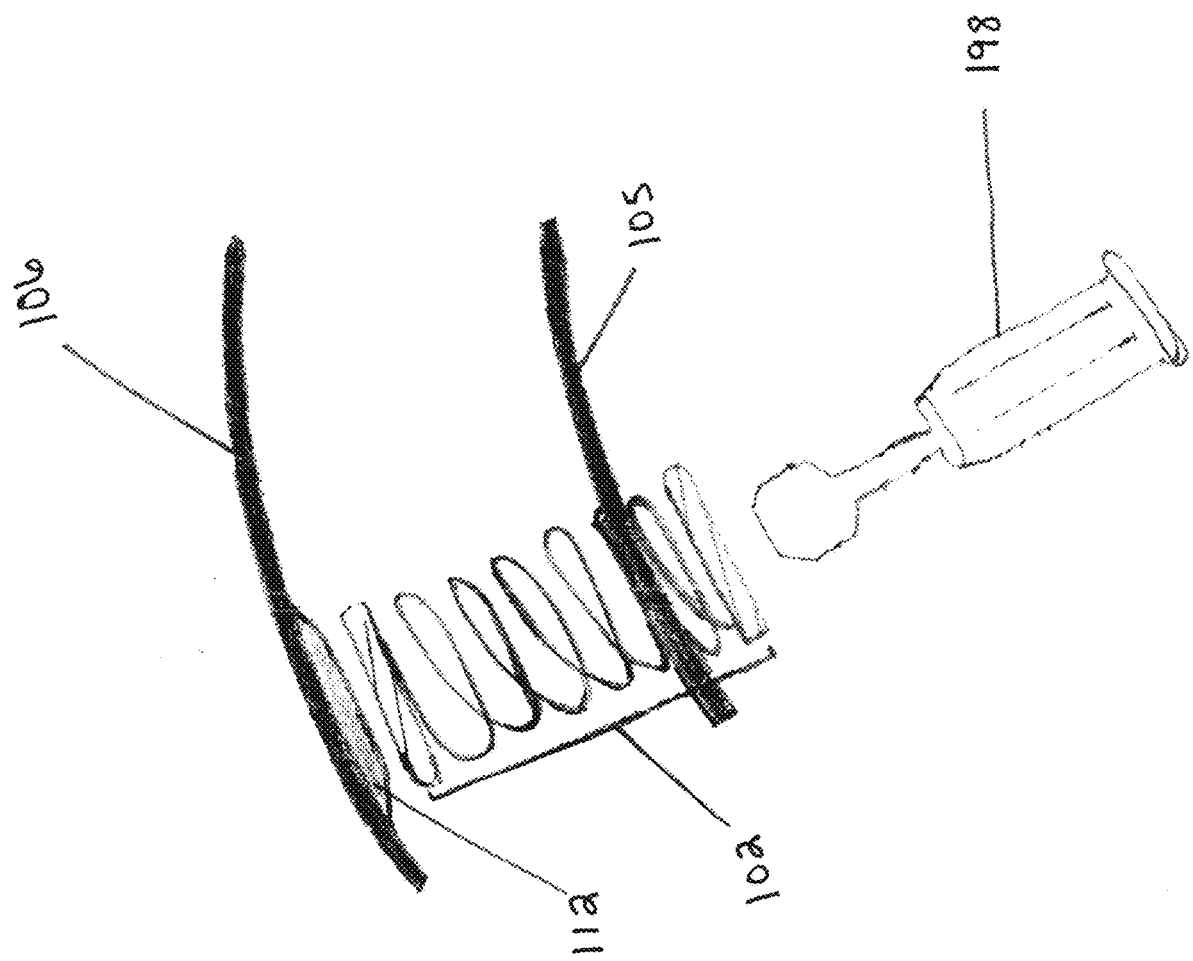

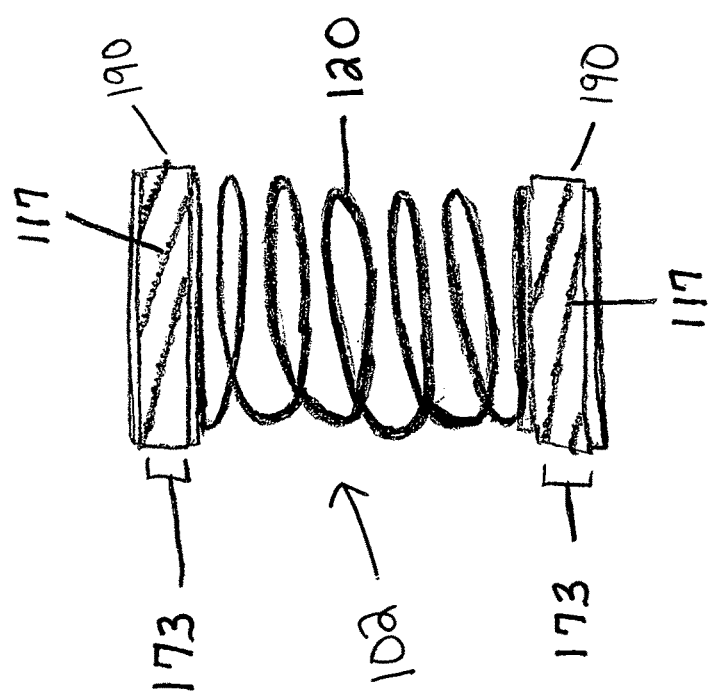

SPRING ABSORPTION TECHNOLOGY (S.A.T.) HELMET

RELATED APPLICATIONS

This application is a continuation in part of application Ser. No. 14/833,027 filed on Aug. 21, 2015.

TECHNICAL FIELD

The present Invention relates to protective members such as helmets and more particularly to helmets comprising interchangeable compression springs, that can absorb an impact force.

BACKGROUND

Protective helmets have a variety of fields in which they are used including football, baseball, cycling, snowboarding and many more activities. Helmet go through testing to determine the effectiveness and quality of their design and to determine safety according to industrial standards. The original goal of helmets was to prevent skull fractures. A hard outer shell does a wonderful job at preventing skull fracture. However, over the past years, it has been noted that other brain related impacts other than skull fracture can occur due to injuries to the head. CTE is one of the brain injuries being learned about. The NFL has encountered CTE in some of its former players. It is believed that CTE occurs in NFL athletes as a result of concussions. As of now CTE is diagnosed postmortem. The brain is encased in fluid that give it a floating effect. The brain is thought to have independent movement from the skull during head trauma episodes. The fluid is a protective liner between the skull and brain. Therefore, a helmet that protects more than skull fractures is desired. Grant (U.S. 20150047109) discloses a helmet including a compression spring, but it lacks spring cap ends that connect two or more shells together. Grants springs also lack the ability to screw out and be removed from the helmet. Rennaker (U.S. 20150359285) discloses another helmet design. Although Rennaker uses a unity connector to connect two shells, it lacks the threaded spring caps that allow removal of the connector springs by unscrewing them without causing damage to the invention. The present invention overcomes the above drawbacks.

SUMMARY

The present invention, referred to herein as the SAT helmet is a multi layered helmet including an outer shell and at least one inner shell connected and separated by removable and/or exchangeable connector and action springs formed from compression springs. Because the shells are separated by compression sings during impact, the springs will determine the rate at which the shells compress because the springs are actually compressing. During the stage of compressing, the energy absorbed from the impact is stored in the compressed spring. The compression stage also causes deceleration between the force that impacts the outer shell and the residual of that force that will reaches the inner shell. The ability to decelerate force and absorb force before it reaches a padded member of the helmet's innermost shell will cause less force to effect the head, therefore causing less movement of the head, which will result in better protection to the skull as well as the brain.

The invention of the connector spring and action spring used in this helmet, is the innovative item that will enhance the quality of life for athletes that play physical sports and those that partake in dangerous or risky activities. The use of at least one threaded spring cap and at least one mating threaded opening allows a user to screw, twist or rotate connector and action springs to attach them to the shells or remove them from the shells without damaging the shells or springs. The removable springs open up a level of customization that is needed and desired. With springs that are made in different strengths, sizes, thickness, compression rates, colors etc. . . . , the customization is plentiful. The ability to have helmets for a 12 year old football team and have springs inserted to compress at a rate that is the safest for their head and brain; and by simply changing the compression spring you can transform that helmet into one that is safest for a 6 year old team or varsity high school, college or pro team. A simple change of springs can take a motorcycle helmet from protecting a kid that may fall at a max speed of 40 mph to that of an adult who may fall at 100 mph. It is not limited to football or motorcycle helmets. The SAT technology is available in all head protection equipment. The unique removal and exchangeable of springs make the SAT helmet highly customizable.

BRIEF DESCRIPTION OF THE DRAWINGS

FIG. 6 is a transparent view of a jaw pad 104 comprising a comfort layer 150, polytherepudic layer 148, a spring cap connector layer 146, a connector spring 102, attachment clips 140 and a cover layer 155.

FIG. 7 is a transparent side view of an outer shell 106 with shell pods 112 and a inner shell 105 used to connect the spring cap of the connector spring 102, the view also shows a connecting tool 198 used to rotate the connector spring connecting the spring caps to the shells.

DETAILED DESCRIPTION OF THE INVENTION

Figure 1:
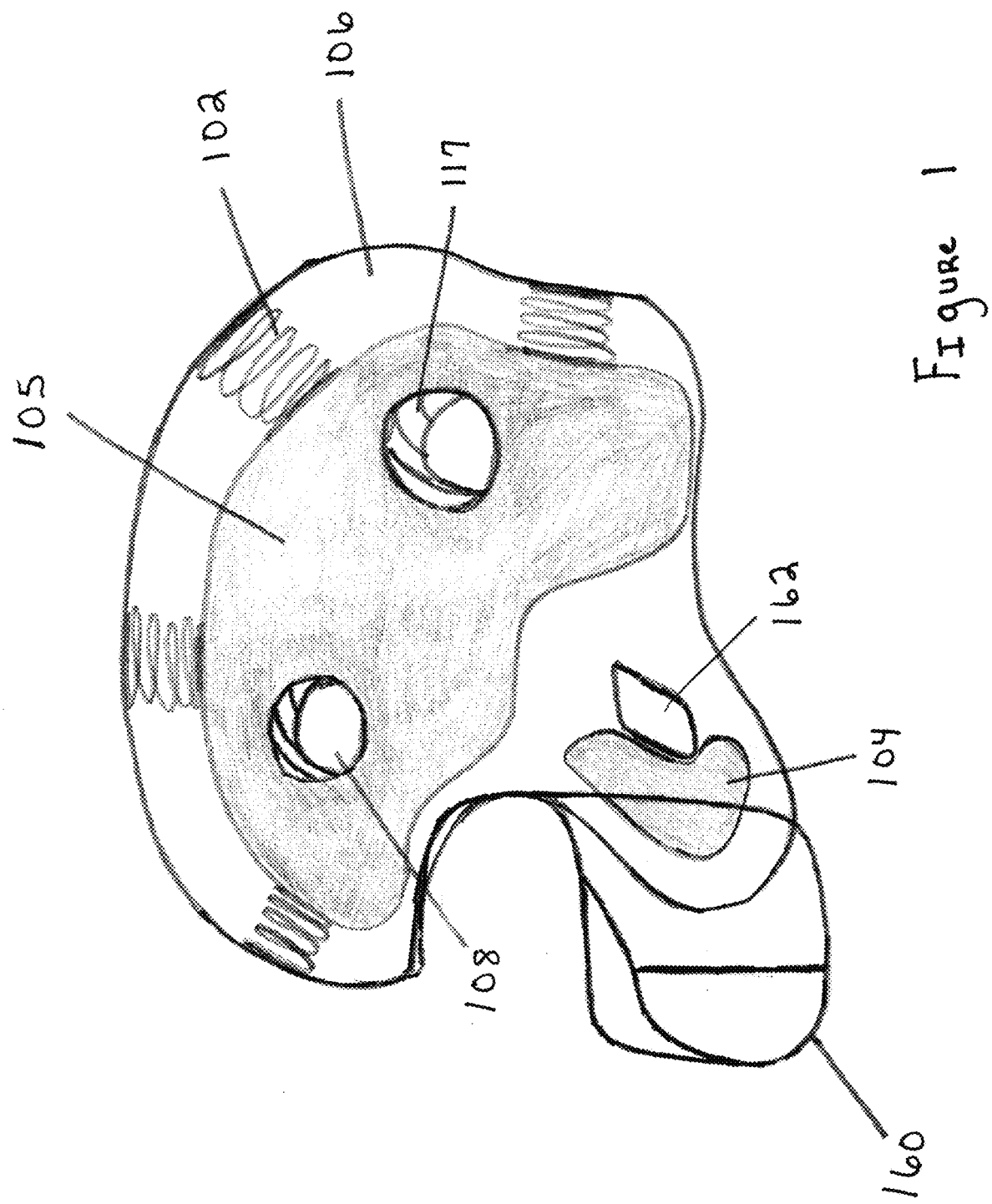
FIG. 1 is a transparent side view of an SAT helmet comprising an inner shell 105, an outer shell 106, holes 108 within the inner shell 105 lined with thread 117 and connector springs 102 connecting the outer shell 106 and the inner shell 105. Also shown is a jaw pad 104 with and example of an ear hole design 162 with and attached face mask 160.
Figure 2:
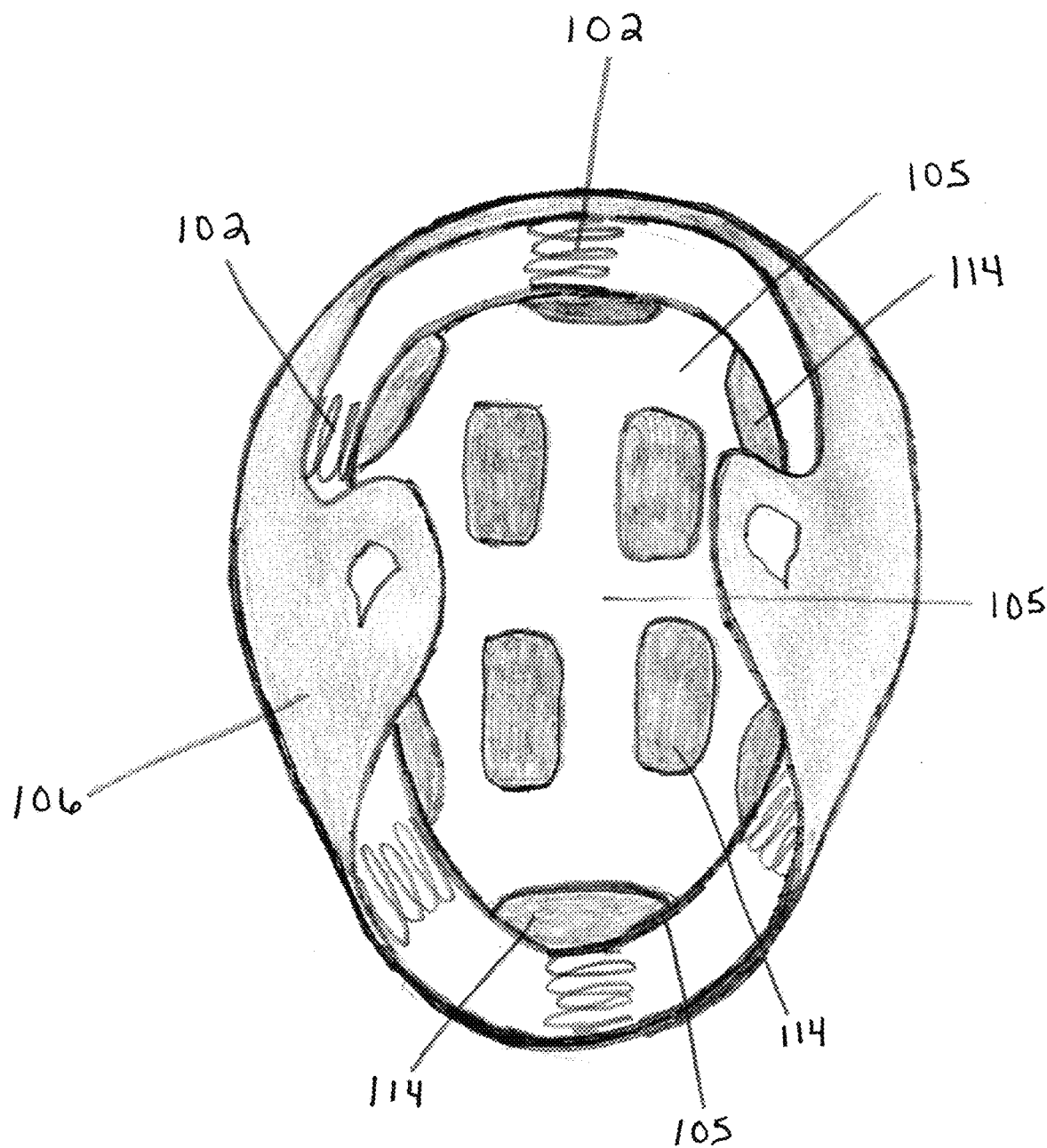
FIG. 2 is a bottom up view of an assembled SAT helmet comprising an outer shell 106 and an inner shell 105 connector springs 102 and padded member 114.
Figure 3:
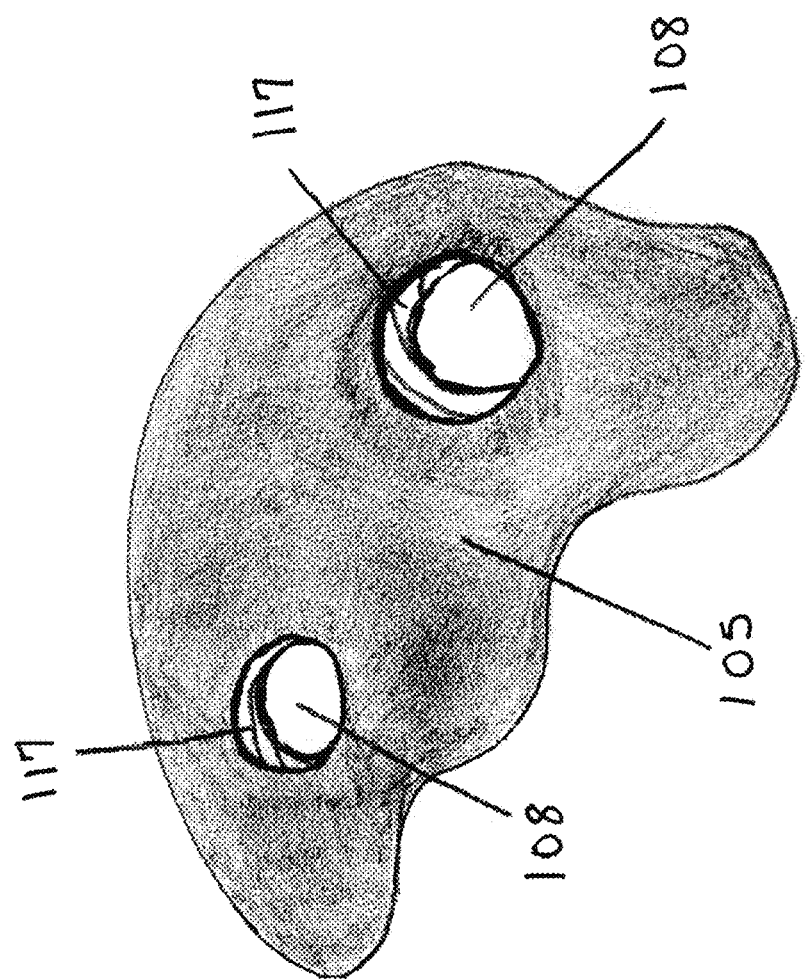
FIG. 3 is a side view of an inner shell 105 that comprises one or more holes 108 in which the holes are lined with thread 117 that engages with the partnering thread of the spring caps' thread.
Figure 4:
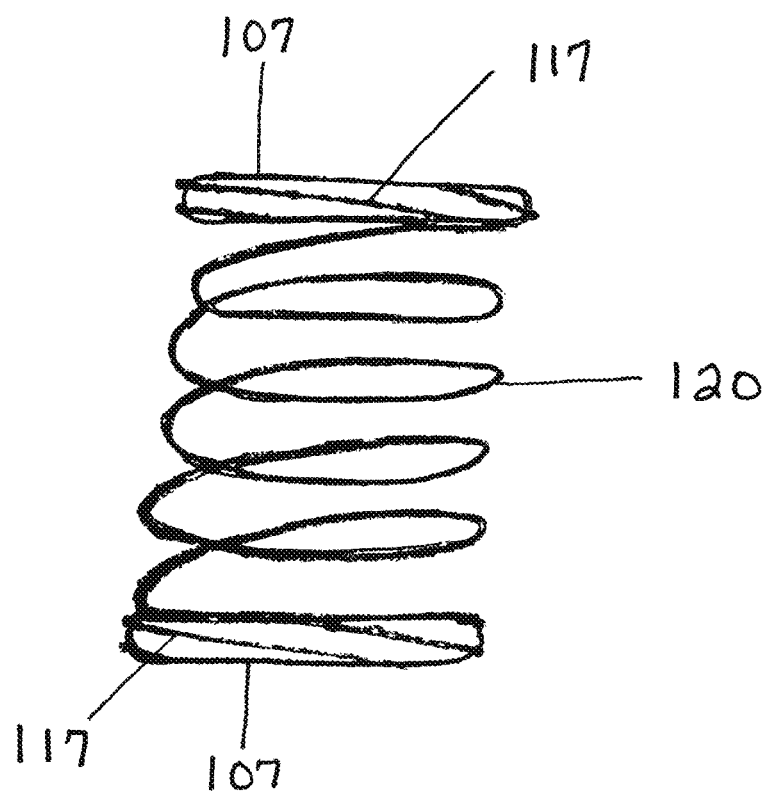
FIG. 4 is a side view of a connector spring formed by a compression spring 120 with two spring caps 107 having thread 117 which is used to connect the spring cap to the designated partnering thread of the shell.
Figure 5:
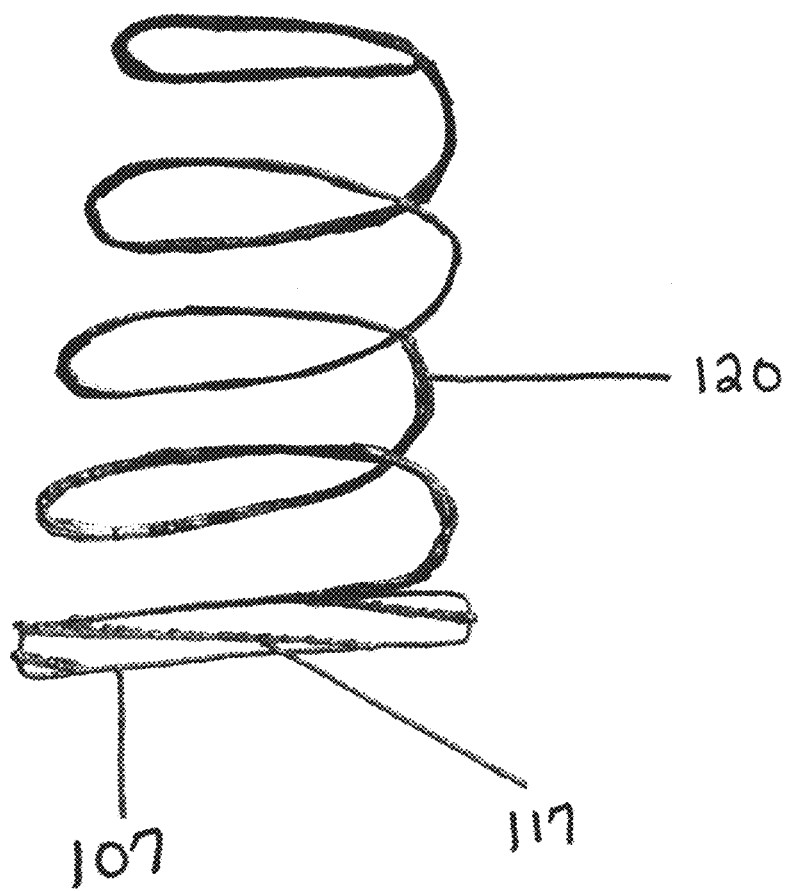
FIG. 5 is a side view of an action spring 101 formed by one spring cap 107 having thread 117 so as to form a threaded spring cap and a compression spring 120.
Figure 9:
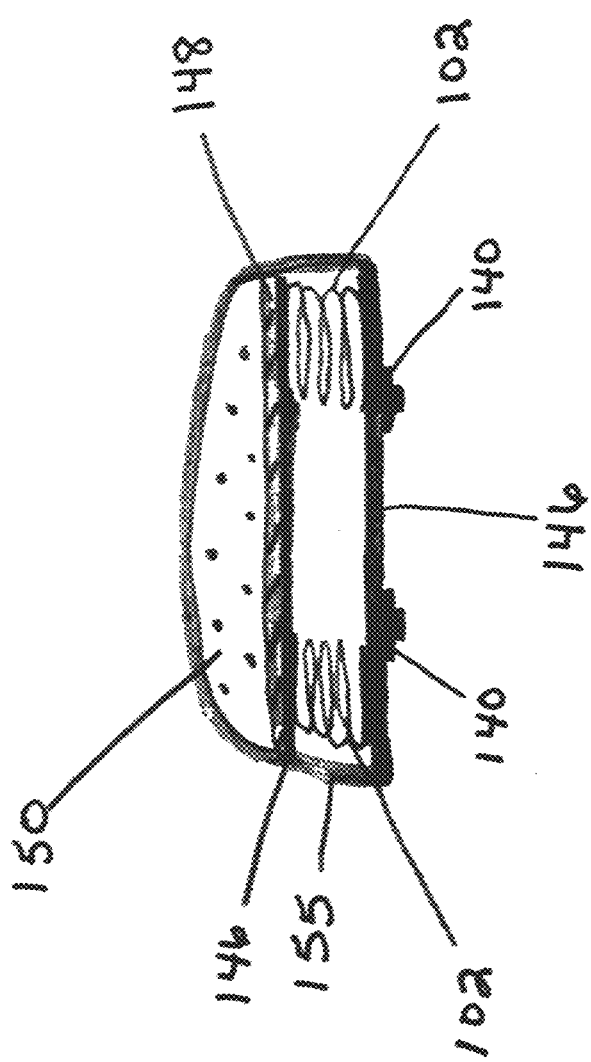
FIG. 9 is a side view of an alternate embodiment of connector spring 102 that shows thread 117 that is used to engage with its threaded partner. Also shown is the rotating portion of the spring cap 173.
Figure 8:
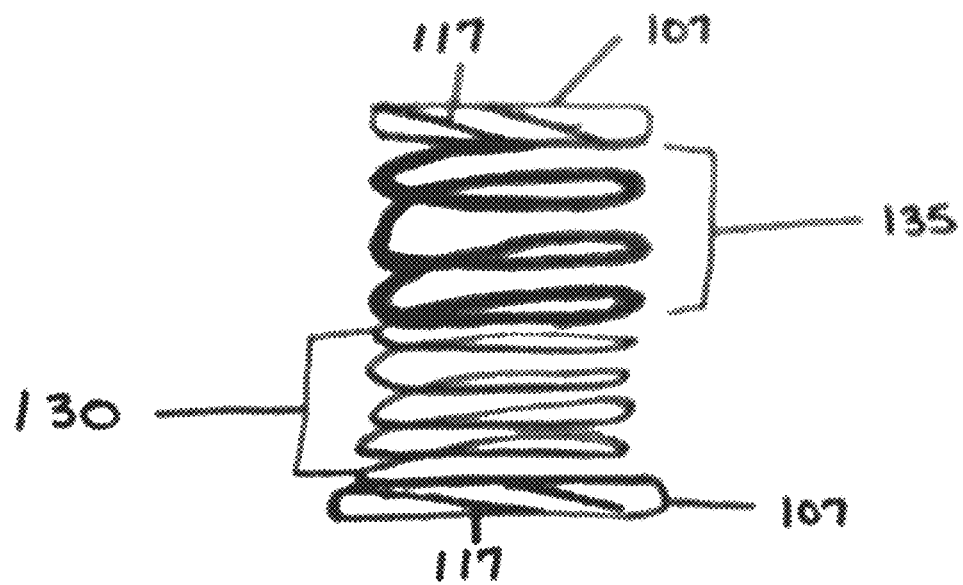
FIG. 8 is a side view of a connector spring 102 in unity with multiple zones 135,130 having different compression rates, thickness and strengths.
Figure 10:
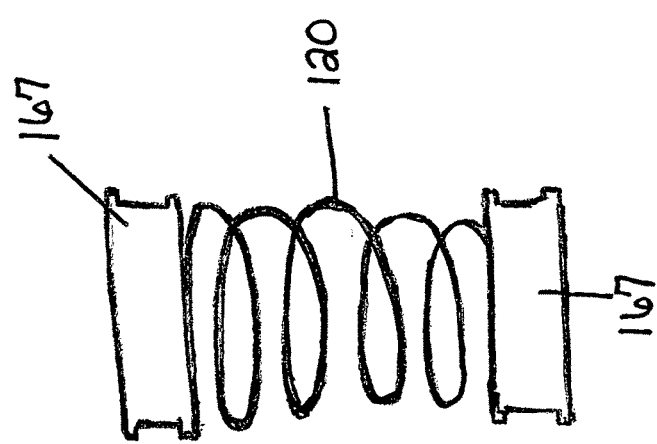
FIG. 10 is a side view of the connector spring 102 of FIG. 9 with the rotating spring cap version that show a compression spring 120 with a spring cap base 167 that house the rotating portion of the spring cap.
Figure 11A:
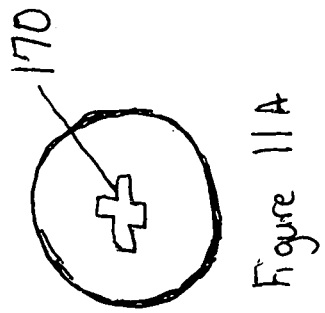
FIG. 11A is a bottom up view of the inner side of a spring cap showing a slot 170 for a connecting tool 198 which is used to rotate the rotating portion of the spring cap to engage the thread 117 of the spring cap and its designated partnering thread.
Figure 11:
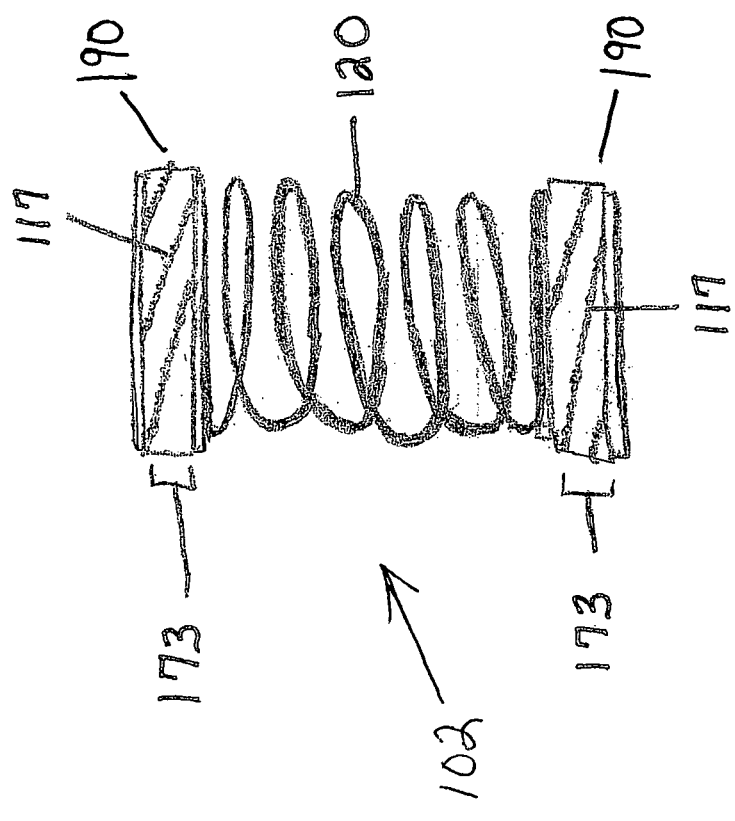
FIG. 11 is a view of the connector spring 102 of FIGS. 9 and 10 with the rotating spring cap version that shows a compression spring 120 with a spring cap comprising thread 117 which is used to connect the spring cap to the shell using a partnering thread of the shell located within the inner portion of the holes.
Figure 11B:
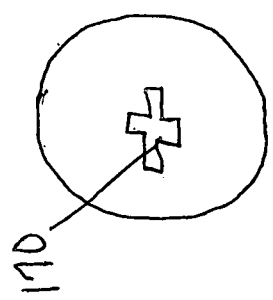
FIG. 11B is a bottom up view of the outer portion of a spring cap used to rotate the rotating portion of the spring cap of the connector spring engaging the thread 117 to its designated partner thread.

The following detailed description of the preferred embodiments should be read in view of the figures. The SAT helmet comprises one or more inner shells(105) and an outer shell(106). The SAT helmet also comprises a connector spring(102), an action spring(101), a padded member for comfort(114), a face mask(160) or face guard if desired, and a chin strap to secure to the head. The SAT helmet comprise a jaw pad(104) as well clips and screws to attach some parts such as the face mask (160).

The SAT helmet comprises one or more inner shells (105). Depending on how many layers of protection is preferred. The inner shells (105) can comprise any material desired to accomplish desired protection needs. For example, producing a bullet proof helmet may comprise an iron shell vs. a cycling helmet which may comprise a desirable carbon fiber or plastic shell. The inner shell (105) comprises one or more holes(108). The holes can comprise different shapes, sides, or depth. The holes(108) of the inner shell(105) also comprises thread(117). The thread(117) of the inner shell(105) is used to connect the spring cap(107) to the helmet by screwing, rotating or twisting the spring cap(107) with an appropriate threaded partner. The threads(117) can flow in any direction. The thread(117) lined in the hole(108) can protrude from the hole(108) or in some design it can be embedded within the hole(108). The hole and thread combination is design to receive the threaded portion of the spring cap(107). The inner portion of the hole(108) that is lined with thread(117) can be referred to as a threaded liner. The thread (117) within the holes (108) engages with a thread partner with a screwing, rotating or twisting motion. The correct partnering thread allows for twisting, rotating or screwing in one direction for connecting or tightening while screwing rotating or twisting in the opposite direction will loosen or disconnect the connected objects. The spring cap(107) comprise a threaded portion design to partner with the thread (117)within the holes(108). Partnered thread can be described as a female and male partnership. Depending on the design of the thread(117). The thread (117) can protrude or be embedded within the spring cap(107) depending on the preference desired. The spring cap(107) rotates twist, or screw into the holes(108) of the inner shell(105) by using the threads(117) on the spring caps and the threads (117)within the inner shells' holes(108). The spring cap (107), connector spring (102) or action spring(101) can comprise materials made of iron, copper aluminum plastic rubber or any combination of materials desired.

The SAT helmet also comprises an outer shell(106). The outer shell(106) serves as the first line of protection when an outside source that come in contact with the helmet. Typically the outer shell(106) is made of a hard plastic, but the outer shell(106) can comprise a soft plastic or carbon fiber or any other material desired. The outer shells also comprise creative shell designs and creative design holes(162) on the shell. The design holes(162) can be ventilation holes or holes around the ear for sound passage or just for styling or finger holes to allow one to pull down on one's head.

The outer shell(106) comprises one or more shell pods (112). The shell pods (112) can protrude from the inner surface of the outer shell (106) or 4 can be flushed with the inner side of the outer shell(106), or the shell pods (112) can be embedded within the inner portion of the outer shell(106). The shell pods(112) comprise a threaded member on an inner portion of the pod(112). That threaded member is used to connect the spring cap(107) to the outer shell(106). The inner liner thread(117) of the shell pod(112) can protrude or be embedded within the shell pod(112). The shell pod(112) comprises a concave inner portion. The concave inner portion comprises the thread (117) therefore the concave inner portion is threaded. That thread is one of many designated partners of the spring cap's (107) thread(117). The concave inner portion of the shell pod (112) can be referred as a threaded inner liner or the inner thread member of the shell pod (112).

The SAT helmet comprises two different compression apparatuses. A connector spring(102) and an action spring (101). The connector spring(102) comprises a compression spring(120) and two or more adjoining spring caps(107) attached. The connector spring(102) attaches one or more inner shells(105) to the outer shells(106). The action spring (01) comprises a compression spring(120) and one adjoining spring cap(107). The action spring(101) connects to one or more inner shells (105) via the spring cap, but not the outer shell(106). The compression spring(120) used for the connector spring(102) or the action spring(101), can comprise a coil spring version that will allow for specific spring rate to be accomplished over a particular distance or It can comprise the wave spring design or any other spring design that compress. The material used to produce the compression spring(120) can range from rubber, copper, titanium, iron, aluminum, plastic or comprise any other material or combination of material desired. The compression spring(120) may comprise multiple zones(130)(135) within the compression spring(120). Each zone(135)(130) comprising its own independent compression rate. Zone (130) may compress over a different distance and absorb a different amount of force than zone (135). The zones differences can be achieved by using different materials, the thickness or strengths of materials, by having different pitches or a combination of things that produces different compression rates.

The spring cap(107) portion of the connector spring(102) and the action spring(101) comprise a threaded portion(117) that enables connection between the shells(105,106) and the spring caps(107). The spring cap(107) also comprises a slot(170) for a tool(198) to twist the caps(107) to secure them to the shells(105,106). It can also be done by hand if desired. Having a threaded end on the spring cap(107) and threaded lining in the shell pods(112) and holes(108) lined with thread(117) allow for opposite twisting to loosen for disconnecting the spring cap(107) from the shells(105,106) of the helmet as well as to connect or tighten the spring cap(107) aid to the shells(105,106).

The spring caps(107) can comprise an outer rotating portion(173) depending on the design, in which that outer rotating portion(173) rotates independently of the compression spring(120). It can also rotates independently of the spring cap base(167). The spring cap comprises the spring cap base (167) when using the rotating spring cap version. The rotating outer portion(173) of the spring cap(190) also comprise thread (117). The spring cap(190) comprise a slot(170) on the inner side or outer side or both. The slots allows a tool(198) to fit within it to allow rotation of the spring cap(190) for connection. The inner side slot(170) allows tool (198) to pass through the inner portion of the compression spring(120). The outer slot can be inserted from the outer side of the spring cap. The process in connecting the shells would rotate the spring cap(190) in one direction but if rotated in the opposite direction it would disconnect a connected shell from the spring cap.

The inner side of the inner shell may comprise a padded member(114). The padded member(114)comprises a layer of thermoplastic polyurethane(148), or similar material and a soft comfort layer(150) for a comfortable fit. The padded member(114) can be inflated for sizing or comfort purposes.

The SAT helmet may also comprise a facemask(160) or a face guard depending on the use of the helmet. Some SAT helmet may not use a face guard or face mask like for cycling helmet. The football design will comprise a face mask(160) and motorcycling helmet would comprise a face guard and etc.

The SAT helmet would also comprise a chin strap to secure the helmet to the head. The SAT helmet also comprises a jaw pad(104). The jaw pad(104) comprises an attaching clip(140) to the outer portion of the pad(104) that snaps into the female or male snap on the inner side of the outer shell(106). The jaw pad(104)comprises multiple layers. An outer layer comprising a soft comfortable layer(150), a layer of thermoplastic polyurethane(148) or similar material layer and a compression spring(120) with attachments on each end that connect to the spring cap connector layer(146). The layers may comprise and be enclosed within a cover layer(155) comprising leather, cloth or any other material desired. Said padded member(114) used in the helmet can comprise the same layers of the jaw pad(104). The padded member(114) may be connected to the inner shell(105) via Velcro or any other adhesive substance.

Connecting outer shell (106) and inner shell(105) using the spring cap portion(107) of the connector spring(102) and the shell pods(112) of the said outer shell and the holes (108) of the inner shell produces a multiple layered helmet comprising two or more shells in which the multiple layers are separated by one or more connector spring(102). Twisting or rotating connector springs out of it connected state produces two or more individual shells and a connector spring. The connector spring(102) or action spring (101) can be encased in a casing, fabric, leather or any other material. With the threads that are used in the helmet it allows the connector and action spring to be removable and exchangeable.

Although the Threads(117) used in the describe example connects to the helmet by twisting, rotating, or screwing, the threads may be configured to connect by means of snapping into place.

The padded member(114) and the Jaw pad(104)comprise a spring cap connector layer(146). The spring cap connector layer(146) has a shell pod(112), said shell pod(112) houses the spring cap(107)of the connector spring(102)during connection of said connector spring(102) and connector layer (146) used in the pads(114,104). The shell pod(112) can snap, rotate, screw or twist the partnering spring cap member(117) for connection. The thread(117) used in this helmet engages with the spring cap's thread(117) and the shells' thread(117) located in the shell pods(112) holes(108) and connector layer(146). The shell pod(112), holes(108) and connector layers(146) are all partnering members with the spring cap's thread(117). The thread(117) are used to connect two items together by screwing, twisting, or rotating; Those threads(117) can be internal thread(female) or external threads (male). The thread's (117) partnering member may be opposite threads; for example the spring cap thread (117) can be male and the shell pod(112)or holes'(108) thread(117) can be female. In this application the shell pod's(112), holes'(108) and connector layer's(146)thread (117) is an internal/female thread while the spring caps' thread(117) is an external/male thread.

The spring cap's(107) end of the unity connector spring (102) that connects into the shell pod(112) may comprise a smaller spring cap(107) than the spring cap that connects to the inner shell's hole(108). That will allow the connector spring's smaller end to pass through the inner shells holes (108) and not be interfered with by the hole or it's thread (117), which will allow it to reach the shell pod(112) of the outer shell for connection of both inner and outer shells to a connector spring at the same time. Once the outer shell, inner shell, and connector springs have been connected, they form a multilayered helmet. The outer shell(106) moves independently of the inner shell(105) once the shells (106, 105) are interconnected with the connector springs. When an outside force impacts the helmet, the outer shell(106) moves toward the inner shell(105). That movement is impaired or slowed down by the compression spring(120). The compression spring absorbs the force by compressing. In the event the compression spring reaches its fully compressed state and all of the impact hasn't been absorbed, then the residual force would impact the inner shell and padded members. The threaded spring caps allow for different compressing springs having different spring rates or compression forces to be used with the same shells by rotating, screwing or twisting one out and rotating screwing or twisting a new one in; creating a multilayered helmet that has different absorption abilities. The thread(117) provides the ability to remove the springs(101,102) from the shell without damaging either the springs or the shells.

The invention claimed is:
1. A protective helmet comprising:
a first shell, the first shell having shell pods protruding from an inner surface of the first shell, each of the shell pods comprising a threaded inner portion;
a second shell within the first shell, the second shell comprising threaded apertures extending through the second shell, wherein the threaded inner portion of each of the shell pods aligns with a corresponding threaded aperture of the second shell;
a padded member attached to an inner surface of the second shell;
a plurality of connector springs connecting and separating the first shell and the second shell, each connector spring of the plurality of connector springs comprising a compression spring, a first threaded spring cap, and a second threaded spring cap, the first threaded spring cap being smaller than the second threaded spring cap;
the compression spring having a first end directly attached to the first threaded spring cap and a second end directly attached to the second threaded spring cap, the compression spring separating and between the first threaded spring cap and the second threaded spring cap;
the first threaded spring cap of each connector spring is connected to the first shell by screwing the first threaded spring cap into the threaded inner portion of one of the shell pods such that thread of the first threaded spring cap engages with thread of the threaded inner portion;

the second threaded spring cap of each connector spring is connected to the second shell by screwing the second threaded spring cap into the corresponding threaded aperture of the second shell such that thread of the second threaded spring cap engages with thread of the corresponding threaded aperture of the second shell;

the plurality of connector springs being removable from the first and second shells by unscrewing the first and second threaded spring caps to allow customization of the protective helmet.

2. The protective helmet of claim 1, wherein at least one compression spring of the plurality of connector springs has a first zone and a second zone, the first zone having a first compression rate, the second zone having a second compression rate, the first compression rate being different from the second compression rate.

3. The protective helmet of claim 1, further comprising a multi-layer jaw pad, the multi-layer jaw pad comprising: a comfort layer, a spring cap connector layer, connector springs, attachments clips, and a cover layer.

* * * * *